(12) United States Patent
Çalışkanoğlu

(10) Patent No.: US 12,210,885 B2
(45) Date of Patent: Jan. 28, 2025

(54) GRAPHICAL USER INTERFACE FOR NOTIFICATION ARRANGEMENT IN A NETWORKED COMPUTER SYSTEM

(71) Applicants: Atlassian Pty Ltd., Sydney (AU); Atlassian Inc., San Francisco, CA (US)

(72) Inventor: Ihsan Çalışkanoğlu, Ankara (TR)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/708,380

(22) Filed: Mar. 30, 2022

(65) Prior Publication Data
US 2023/0315492 A1   Oct. 5, 2023

(51) Int. Cl.
*G06F 9/451* (2018.01)

(52) U.S. Cl.
CPC .................. *G06F 9/451* (2018.02)

(58) Field of Classification Search
CPC ........................................................ G06F 9/451
See application file for complete search history.

(56) References Cited

U.S. PATENT DOCUMENTS

| 5,621,876 A * | 4/1997 | Odam | G06F 40/18 715/788 |
| 6,774,786 B1 * | 8/2004 | Havekost | G05B 23/0272 700/83 |
| 2002/0012011 A1 * | 1/2002 | Roytman | H04L 41/22 709/224 |
| 2004/0111471 A1 * | 6/2004 | Stoner | H04L 41/0681 709/204 |
| 2016/0189077 A1 * | 6/2016 | Azmoon | G06Q 10/109 705/7.26 |
| 2018/0314882 A1 * | 11/2018 | Yu | G06Q 10/101 |
| 2020/0127604 A1 * | 4/2020 | Kosharovsky | H02S 50/00 |
| 2022/0108276 A1 * | 4/2022 | Stringham | G06F 3/0481 |

* cited by examiner

*Primary Examiner* — Daniel W Parcher
(74) *Attorney, Agent, or Firm* — Brownstein Hyatt Farber Schreck, LLP

(57) ABSTRACT

Systems and methods for displaying improved user interfaces are disclosed. The method includes: receiving a request to load a user interface (UI) on a client device, the UI comprising a plurality of object decks. For each of the plurality of object decks, the method includes retrieving object deck parameters; executing a search to identify one or more objects that match the object deck parameters; receiving object data for the identified one or more objects; and communicating the object data to the client device. The client device is configured to render the UI with the plurality of object decks, each object deck includes graphical elements of the one or more objects that match the object deck parameters, the graphical elements generated based on corresponding object data.

20 Claims, 9 Drawing Sheets

Alerts

Search   Add Deck

| Deck1: Prod US 202 | Deck2: Prod Dubai 204 | Deck3: Prod London 206 |
|---|---|---|
| [P4] Alarm: Server in US West Oregon — Apr 15, 2021 1:33PM  [Open] | [P4] Alarm: Server overload in Dubai — Apr 15, 2021 1:33PM  [Ack'ed] | [P3] Alarm: Server load too high in London — Apr 15, 2021 1:33PM  [Open] |
| [P3] Metrics exceeded threshold — Apr 15, 2021 1:33PM  [Ack'ed] | [P5] Alarm: Application failed to load — Apr 15, 2021 1:33PM  [Open] | [P2] Unusually high metrics in last 30 minutes — Apr 15, 2021 1:33PM  [Ack'ed] |
| [P2] Server overload in California — Apr 15, 2021 1:33PM  [Snoozed] | | [P5] Alarm: Server crashed in London — Apr 15, 2021 1:33PM  [Open] |
| [P4] Alarm: Application write throttled — Apr 15, 2021 1:33PM  [Open] | | [P4] Application response speed below threshold — Apr 15, 2021 1:33PM  [Snoozed] |

FIG. 2

GRAPHICAL USER INTERFACE FOR NOTIFICATION ARRANGEMENT IN A NETWORKED COMPUTER SYSTEM

FIELD

Aspects of the present disclosure are directed to graphical user interfaces, and in particular to improved graphical user interfaces.

BACKGROUND

Oftentimes, graphical user interfaces are created that display a plurality of objects and data associated with those objects. However, while various objects and data associated with the objects may be displayed via a user interface, many current user interfaces display data in a way that is not easily or efficiently consumed by the user. Additionally, many current user interfaces are not adapted to reduce the cognitive burden on users and reduce the amount of time required to perform various tasks.

SUMMARY

Example embodiments described herein are directed to a computer implemented method. The method includes receiving a request to load a user interface (UI) on a client device. The UI includes a plurality of object decks. For each object deck, the method further includes retrieving object deck parameters; executing a search to identify one or more objects that match the object deck parameters; receiving object data for the identified one or more objects; and communicating the object data to the client device. The client device may be configured to render the UI with the plurality of object decks, each object deck comprising graphical elements of the one or more objects that match the object deck parameters, the graphical elements generated based on corresponding object data.

Example embodiments described herein are directed to another computer implemented method. The method includes receiving, at a client device, an update notification for updating a user interface displayed on the client device. The user interface includes a plurality of object decks. Each object deck displays one or more objects that have common object parameters. The update notification includes an identifier of an updated object and identifiers of one or more object decks the updated object is present in. The method further includes updating the one or more object decks based on the update notification.

Some example embodiments are directed to a computer processing system including a processing unit, and a non-transitory computer readable medium storing instructions, which when executed by the processing unit, cause the computer processing system to perform the methods described above.

Some other example embodiments are directed to a non-transitory computer readable medium storing instructions executable by a processing unit to cause the processing unit to perform the methods described above.

BRIEF DESCRIPTION OF THE DRAWINGS

In the drawings:

FIG. 2 illustrates an example alert user interface according to aspects of the present disclosure.

Figure 1:
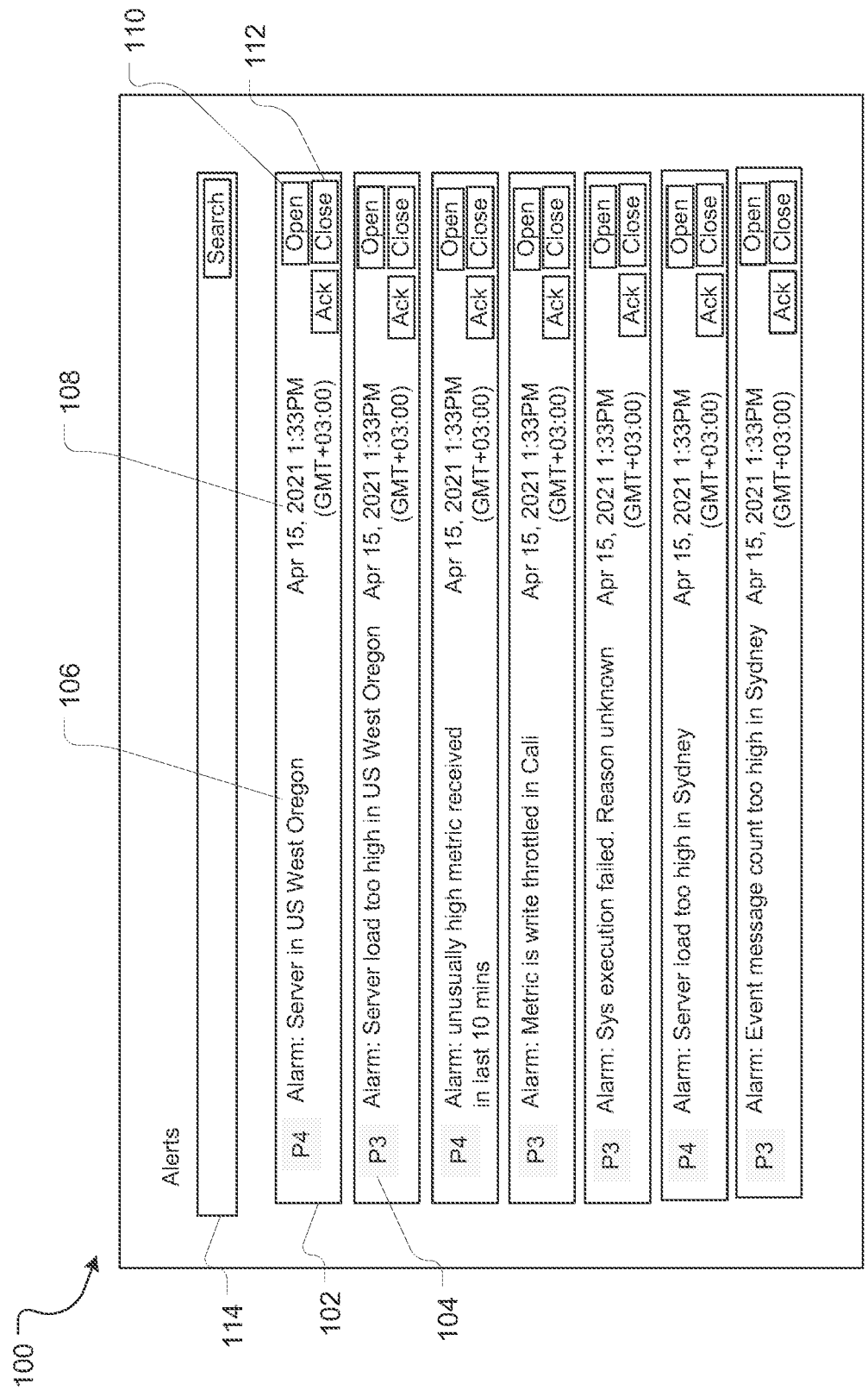
FIG. 1 illustrates a conventional alert user interface.

While the description is amenable to various modifications and alternative forms, specific embodiments are shown by way of example in the drawings and are described in detail. It should be understood, however, that the drawings and detailed description are not intended to limit the scope of the embodiments to the particular form disclosed. The intention is to cover all modifications, equivalents, and alternatives falling within the scope of the present embodiments as defined by the appended claims.

DETAILED DESCRIPTION

In the following description, numerous specific details are set forth in order to provide a thorough understanding of the embodiments described herein. It will be apparent, however, that the embodiments described herein may be practiced without these specific details. In some instances, well-known structures and devices are shown in block diagram form in order to avoid unnecessary obscuring.

Even though, user interfaces typically display the objects and corresponding data, the user interfaces do not display preferred objects and corresponding data in a user-preferred style and/or efficiently. The data may be displayed in a cluttered manner and/or in a manner that would increase cognitive burden on a user, and thereby, increase time required to perform an action corresponding to the displayed objects and/or corresponding data.

User interfaces described herein in accordance with some embodiments may display objects and corresponding data efficiently and reduce cognitive burden on a user, and thereby, increasing efficiency of the user. Various examples of improved user interface are described in the following sections with reference to a particular example software application—an incident management application (IMA) and in particular with reference to a graphical user interface of an IMA that displays a plurality of incidents/alerts belonging to a project or team. However, it will be appreciated that this is merely an example and that the teachings of the present disclosure can be adopted in user interfaces that display a plurality of objects and their corresponding object data for any software application and in any format. For instance, it may be used in user interfaces that display issues/tickets in an issue tracking system. Similarly, it may be used in user interfaces that display a list of documents hosted by a content management system. In fact, it may be used in any user interface (UI) that displays a plurality of objects without departing from the scope of the present disclosure.

Overview

Incident management applications (IMA) are generally dedicated incident management platform that can be integrated with one or more monitoring tools to provide a single interface for dealing with alerts detected by the integrated monitoring tools. Such an incident management application includes a backend server that is connected to the monitoring tools for receiving notifications from these tools. The server generates and/or manages alerts based on the received notifications. Further, such IMAs include a frontend client that provides status of the alerts and allows users to manage the alerts. For instance, the front end allows users to perform certain actions on the alerts including, assigning an alert to a specific support engineer, changing a priority level of an alert, acknowledging an alert, snoozing an alert, closing or deleting an alert, commenting on an alert, creating an alert, etc. In addition to these features, IMAs can also notify relevant support engineers when an alert is detected. One example of an IMA is Opsgenie (offered by Atlassian, Inc.).

When an IMA is integrated with a small number of monitoring tools or is used to handle a small number of alerts at any given time, it is relatively easy to view these alerts in a UI and manage the alerts in an efficient manner. However, when an IMA is used by a large organization that integrates a large number of monitoring tools with the IMA and/or handles thousands of alerts at any given time—management of alerts becomes difficult.

To help with this, some IMAs allow users to filter alerts based on one or more search criteria. For example, a helpdesk user may be able to filter alerts based on one or more common underlying parameters, e.g., common location, common alert type, common software product, etc. For example, a helpdesk IMA for a multi-national company with offices in New York, London, and Dubai, may be able to perform a search for unresolved alerts originating from the New York office, or perform a search for unresolved alerts from the London office, and so on. New alerts received or created by the IMA are filtered based on the search criteria and only alerts that match the search criteria are displayed in the UI.

FIG. 1 illustrates a typical alerts UI 100. As shown in this example, the alerts UI displays a number of "open" alerts 102—e.g., alerts that have been created but have not yet been resolved. The alerts may be automatically generated by an IMA backend in response to receiving notifications from monitoring systems. Alternatively, or additionally, alerts may be manually created by users via the alerts UI 100. For each alert 102, the UI may provide summary information that may allow a user to quickly identify the alert and determine whether the user wishes to act on the alert at the current time or not. In the example UI depicted in FIG. 1, this summary information includes, e.g., an alert level 104 (indicating the severity of the alert), an alert title or description 106, a timestamp of when the alert was created 108, and a current status of the alert 110. In addition to this, for each alert, the UI 100 may provide one or more actionable/interactive affordances that allow the user to perform one or more operations with respect to the alert. For example, the UI 100 may include an affordance 112 that allows the current status of the alert to be amended (e.g., to change the status from open to acknowledged, snoozed or closed).

Further, the UI 100 includes one or more search interactive elements 114 (e.g., a search bar or selectable affordances) that allow users viewing UI 100 to filter the displayed alerts. For example, if a helpdesk user monitors alerts corresponding to three different products, the helpdesk user may be able to filter the list of alerts displayed in UI 100 using the search interactive element 114 to display alerts corresponding to one of the three products.

Once a filter is applied, the UI 100 is updated to only display alerts 102 that are related to the selected software product. Any new alerts 102 related to that software product will be displayed in the updated UI 100. However, any new alerts that are not related to that software product will not be displayed in the updated UI 100. This filtering may help unclutter the UI 100 and reduce the cognitive burden on the helpdesk user. However, it also poses a problem. For example, a helpdesk user may have filtered the alerts to show alerts related to a single product. In this scenario, if a major incident occurs on one of the other product in the interim (that causes a large number of alerts to be generated in a relatively short period of time), the helpdesk user will be unaware of this as the UI 100 filters out those alerts and would not be able to act on the major incident swiftly.

To prevent this, some service desks may not provide a filtering option in the alerts UI 100 or may request users to refrain from using this functionality often. However, unfiltered alerts, especially in large enterprise organizations may inundate helpdesk users, increasing their cognitive burden, and reducing their efficiency to manage alerts.

To address one or more of these issues, aspects of the present disclosure provide improved UIs to display and manage objects, such as alerts, issues, etc. In particular, aspects of the present disclosure introduce the concept of "object decks" and allow display of multiple object decks simultaneously in a single UI. As disclosed herein, an object deck (e.g., an alert deck) is an object domain that includes a list of objects that have one or more common underlying parameters. Each object deck may poll a backend server periodically or receive object data from the backend in real time that matches the common underlying parameters of that object deck. For instance, a user of a helpdesk that services three different offices may create three alert decks for display on his/her alert UI next to each other—each alert deck corresponding to one of the three offices. Unresolved alerts received at the client device may then be populated in one of the three alert decks, depending on which location the alerts correspond to.

FIG. 2 illustrates an example UI 200 according to aspects of the present disclosure. In this example, the UI is an alerts UI 200 that includes three alert decks 202, 204, 206. Each alert deck corresponds to a different office location of an organization. Further, each alert deck 202, 204, and 206 may be associated with a common underlying parameter or search string. In this example, the search strings may be "All unresolved alerts originating from the US office," "All unresolved alerts originating from the Dubai office" and "All unresolved alerts originating from the London office." The alerts 102 are filtered based on these three search strings, and alerts that match the search strings are displayed in the corresponding alert decks.

It will be appreciated that although this example shows one common underlying parameter—e.g., location, for all three of the alert decks, this need not be the case. Alert decks can be created based on any underlying parameters or search criteria, such as alert priority, alert status, alert date/time, keywords or tags associated with alerts, alert owner, alert originating product/monitoring tool, etc. For example a UI may display three alert decks—one showing all unacknowledged alerts, one showing open alerts with a P5 alert rating, and one showing snoozed alerts corresponding to a given originating product, monitoring tool, or location in the last 5 days. It will be appreciated that in such cases, one alert may satisfy the parameters of two or more alert decks and in such cases that alert may be displayed in each of the two or more alert decks. Alerts that appear in more than one alert deck may be highlighted in some manner across the multiple alert decks.

By allowing multiple alert decks 202-206 to be displayed side-by-side, aspects of the presently disclosed UIs better utilize a conventional display. Conventional UIs, such as UI 100, display alerts in a single scrolling list that may, at best, display 7-10 alerts on the screen without scrolling. When an incident occurs and a large number of alerts 102 are generated in a relatively short period of time, such conventional UIs 100 affect user experience considerably.

Aspects of the present disclosure on the other hand allow users to see alerts 102 related to multiple different underlying parameters simultaneously in the same view (thereby increasing the number of alerts displayed on the screen), while still segregating the alerts based on the underlying parameters. This reduces the cognitive burden on users while also preventing situations where a user is blind to unfiltered alerts.

As discussed above, users can create alert decks 202-206 based on any underlying parameters and can modify the selected parameters at any time. To prevent a situation where users may be blind to alerts that don't match any of the parameters used to create alert decks, aspects of the present disclosure may create a default alert deck that displays a list of alerts that do not match the parameters selected by the user to create any of the other customized alert decks. For example, in case of the example discussed above, if a user creates an alert deck for one of the three software applications, the system may automatically create another alert deck that shows alerts related to the other two software applications. As the user adds, deletes or modifies the customer alert decks created by the user, the parameters of the default alert deck may also be updated.

Although the object decks of the present disclosure are described with reference to alerts, it will be appreciated that this is merely exemplary. Object decks can be used in other types of UIs as well, where showing segregated objects simultaneously is advantageous. These and other features and advantages of the presently disclosed systems and methods will be described in detail in the following sections.

Networked Environment

Figure 3:
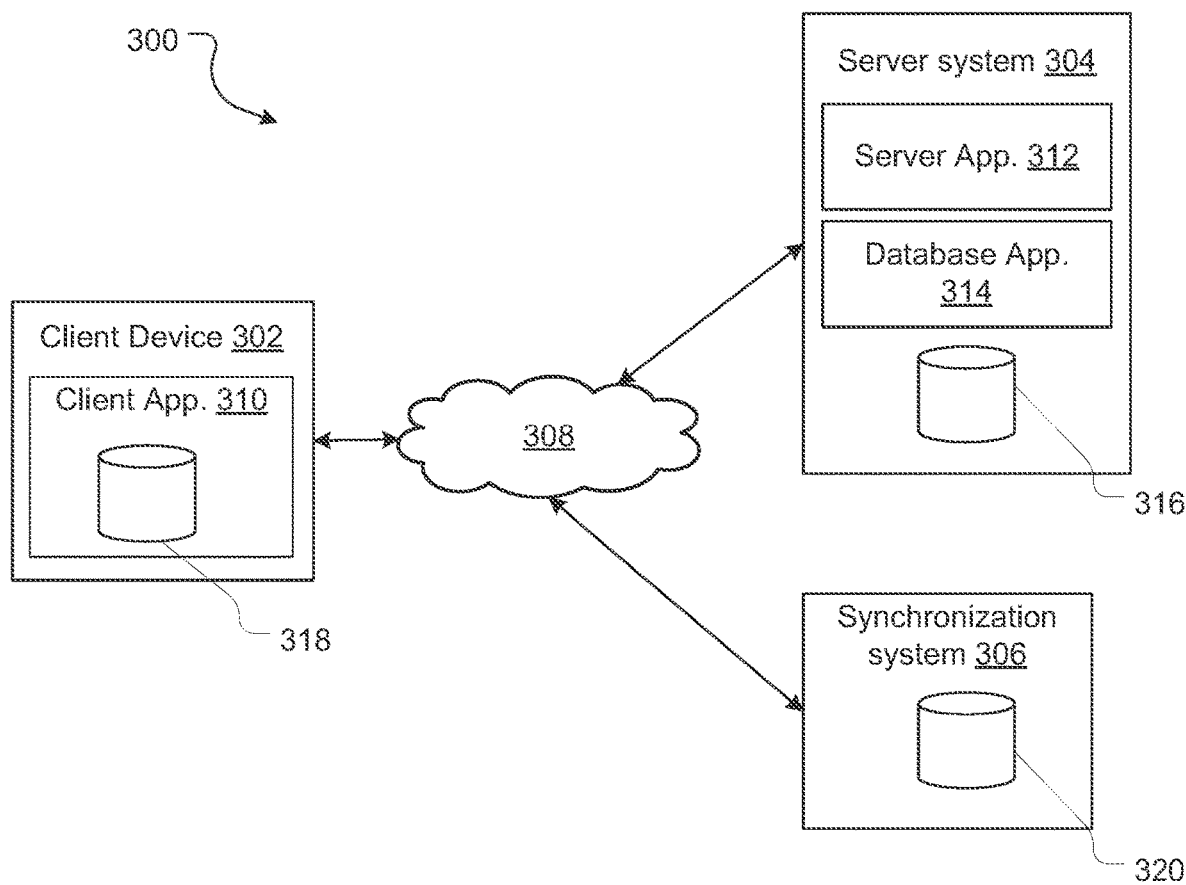
FIG. 3 is a block diagram depicting a networked environment in which various features of the present disclosure may be implemented.

FIG. 3 depicts one example of a networked environment 300 in which the various operations and techniques described herein can be performed. In particular, FIG. 3 illustrates the systems and platforms that may be utilized to provide the UIs disclosed herein. The networked environment 300 includes client devices 302, a server system 304, and an intermediate synchronization system 306 which communicate via one or more communications networks 308 (e.g., the Internet).

The server system 304 is a system entity that hosts one or more server applications 312. The server application 312 is executed by the server system 304 to configure it to provide server-side functionality to one or more corresponding client applications (e.g., 310). Examples of server applications 312 hosted by the server system 304 include incident management applications (e.g., Opsgenie), collaborative applications (e.g., Confluence), software code management systems (e.g., Bitbucket), and issue tracking applications (e.g., Jira). Opsgenie, Jira, Confluence, and BitBucket, are offered by Atlassian, Inc. It will be appreciated that these software applications are merely exemplary and that the server system 304 can host any other product application without departing from the scope of the present disclosure.

In order to function, the server application 312 comprises one or more application programs, libraries, APIs or other software elements that implement the features and functions that are described herein. For example, in case the server application 312 is an IMA, the server application 312 may include programs to receive notifications from one or more monitoring tools (not shown) integrated with the IMA, generate and manage alerts corresponding to the received notifications, authenticate users, notify on-call support engineers when alerts are generated, and receive updates from client devices 302. In addition, the server application 312 may be configured to communicate update notifications to the synchronization system 306 and service update requests from the client devices 302.

The server system 304 may be a web server (for interacting with web browser clients), a mobile web server (for interacting with mobile clients), or an application server (for interacting with dedicated client applications) or may be a combination server that includes web server, mobile web server, and application server module. Examples of web servers include Apache, IIS, nginx, GWS, etc.

In the present example, the server system 304 also includes a database application 314. Database application 314 provides access to one or more databases 316, which store content relevant to the services being offered by the server system 304. In the example of an IMA, such content may include, for example, data related to alerts generated and managed by the server system 304, data related to users/clients registered to utilize the server system 304, etc. Further, the database 316 may include a database of on-call schedules of support engineers and a database maintaining permissions, etc.

While the server system 304 is depicted and described as a single server machine, alternative architectures are possible. For example, in certain cases, a clustered server architecture may be used where multiple server computing instances (or nodes) are instantiated on one or more computer processing systems to meet system demand Conversely, in the case of small enterprises with relatively simple requirements, the server system 304 may be a stand-alone implementation (e.g., a single computer directly accessed/used by end users). In FIG. 3, for simplicity, the server system 304 is illustrated as a single system.

The synchronization system 306 provides mechanisms for receiving update notifications from the server system 304 and communicating these to the client devices 302. In addition, the synchronization system 306 may be configured to maintain persistent communication channels between itself and the client devices 302. In one example, these communication channels may be web sockets. Further, in one example, the synchronization system 306 may be the application development service, AppSync offered by Amazon and hosted in the Amazon Web Services (AWS) public cloud. The synchronization system 306 allows the server system 304 to synchronize data for mobile and/or web client applications in real time.

The synchronization system 306 may operate based on a publish-subscribe model. In some embodiments, the server system 304 synchronizes its database 316 with the synchronization system 306. Then, client devices can "subscribe" to certain changes made to the database 316 via the synchronization system 306 and each time these changes are made in the database, the synchronization system 306 can propagate these changes to the connected client devices that have subscribed to receive the changes.

In other embodiments, the database 316 is not directly synchronized with the synchronization system 306. Instead, the server application 312 communicates update notifications to the synchronization system 306. In such embodiments, the synchronization system 306 is configured to maintain communication channels with the client devices and forward these update notifications to the connected client devices 302. When an update notification is received, the synchronization system 306 identifies the client devices 302 to which the update notification needs to be communicated and pushes the update notification to the identified clients. Further, the synchronization system 306 maintains a database or cache 320 for receiving and storing update notifications from the server application 312. This notification database/cache 320 can be populated each time a new update notification is pushed to the synchronization system 306. Further, the notification database/cache 320 may be configured to automatically delete older entries (e.g., update notifications received a threshold period of time ago, or update notifications that have already been pushed to clients).

The client device 302 hosts a client application 310 which, when executed by the client device 302, configures the client device 302 to provide client-side functionality/interact with the server system 304 (or, more specifically, server application 312 running thereon). The client application 310 may be a general web browser application (such as Chrome, Safari, Internet Explorer, Opera, or an alternative web browser application) which accesses the server application 312 via an appropriate uniform resource locator (URL) and communicates with the server application 312 via general world-wide-web protocols (e.g., http, https, ftp). Alternatively, or additionally, the client application 310 may be a specific application programmed to communicate with server application 312 using defined application programming interface (API) calls. A given client device 302 may have more than one client application 310, for example both a general web browser application and a dedicated programmatic client application.

When the server application 312 is an IMA, the client application 310 is configured to perform client-side IMA functionality including—e.g., communicating with the server application 312 to receive information about alerts relevant to one or more alert decks created by a user of the client device 302, communicate with the synchronization system 306 to initiate a connection, and communicate with the server application 312 to receive content for updates of alerts displayed in the one or more alert decks displayed on the client device 302. The client application 310 may also be configured to receive user input to update alerts displayed in one or more alert decks.

In some embodiments, the client application 310 may also maintain a display cache 318. The display cache 318 stores data related to alert decks maintained in a user interface displayed on the client device and content (e.g., alerts) currently displayed in the alert decks displayed on the user interface rendered by the client application 310.

The client device 302 may be any form of computing device. Typically, client device 302 is a personal computing device—e.g., a desktop computer, laptop computer, tablet computer, and in some instances even a mobile phone. While only two client devices 302 have been illustrated, an environment would typically include multiple client devices 302 used by users to interact with the server system 304.

The client device 302, synchronization system 306, and server system 304 communicate data between each other either directly or indirectly through one or more communications networks 308. Communications network 308 may comprise a local area network (LAN), a public network, or a combination of networks.

The environment 300 described above and depicted in FIG. 3 is utilized when real time alerting is employed—that is, when the server system 304 pushes updates to client devices in real time. In other cases, e.g., where client devices 302 poll the server application 312 periodically to receive any updates to the one or more alert decks maintained by the corresponding client applications 310, the synchronization system 306 may not be required. In such cases, the environment 300 may simply include client devices 302 and server system 304.

Computer Processing System

The techniques and operations described herein are performed by one or more computer processing systems.

By way of example, client device 302 may be any computer processing system which is configured (or configurable) by hardware and/or software to offer client-side functionality.

Similarly, the server application 312 or database application 314s are also executed by one or more computer processing systems. The server system 304 computer processing systems will typically be server systems, though again may be any appropriate computer processing systems.

Figure 4:
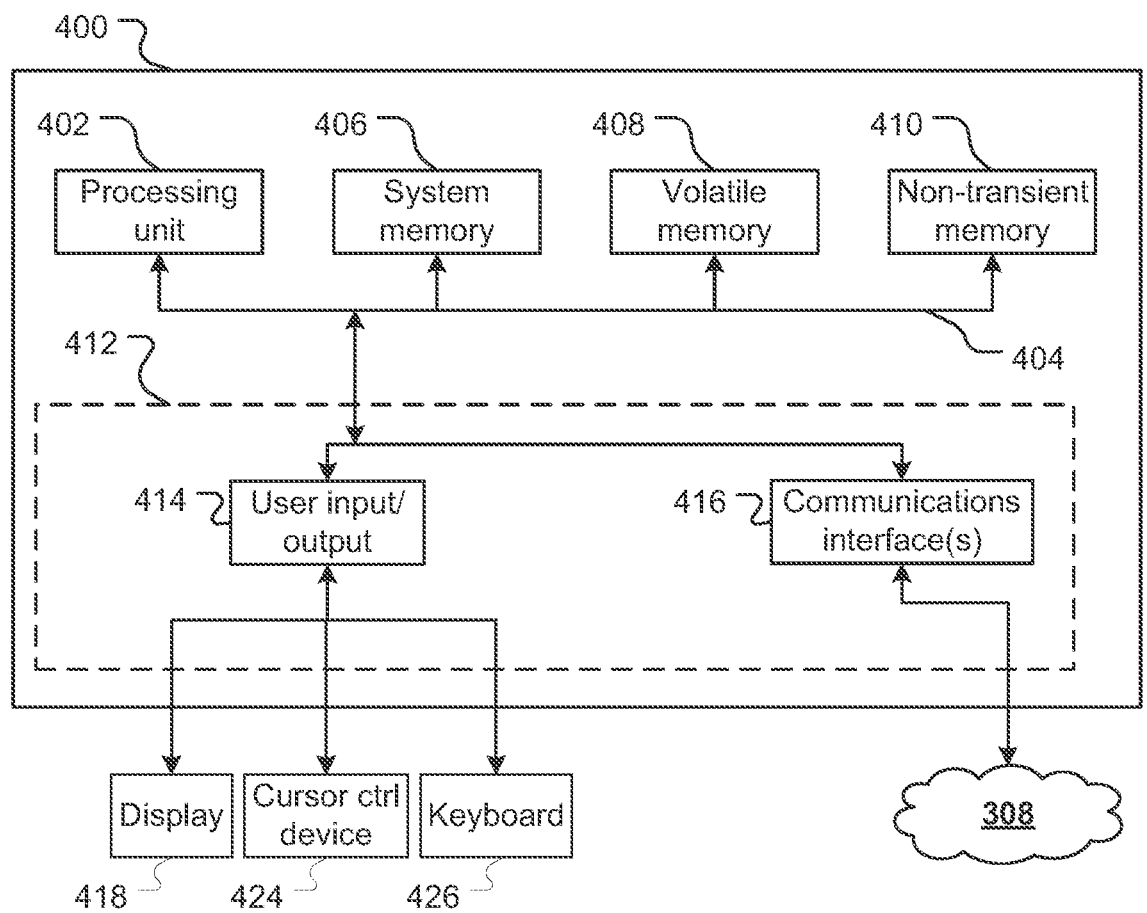
FIG. 4 is a block diagram of a computer processing system configurable to perform various features of the present disclosure.

FIG. 4 provides a block diagram of a computer processing system 400 configurable to implement embodiments and/or features described herein. System 400 is a general purpose computer processing system. It will be appreciated that FIG. 4 does not illustrate all functional or physical components of a computer processing system. For example, no power supply or power supply interface has been depicted, however system 400 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 400 includes at least one processing unit 402. The processing unit 402 may be a single computer processing device (e.g., a central processing unit, graphics processing unit, or other computational device), or may include a plurality of computer processing devices. In some instances, where a computer processing system 400 is described as performing an operation or function all processing required to perform that operation or function will be performed by processing unit 402. In other instances, processing required to perform that operation or function may also be performed by remote processing devices accessible to and useable by (either in a shared or dedicated manner) system 400.

Through a communications bus 404 the processing unit 402 is in data communication with a one or more machine readable storage (memory) devices which store computer readable instructions and/or data which are executed by the processing unit 402 to control operation of the processing system 400. In this example system 400 includes a system memory 406 (e.g., a BIOS), volatile memory 408 (e.g., random access memory such as one or more DRAM modules), and non-transitory memory 410 (e.g., one or more hard disk or solid state drives).

System 400 also includes one or more interfaces, indicated generally by 412, via which system 400 interfaces with various devices and/or networks. Generally speaking, other devices may be integral with system 400, or may be separate. Where a device is separate from system 400, connection between the device and system 400 may be via wired or wireless hardware and communication protocols, and may be a direct or an indirect (e.g., networked) connection.

Wired connection with other devices/networks may be by any appropriate standard or proprietary hardware and connectivity protocols. For example, system 400 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, system 400 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which system 400 connects— whether by wired or wireless means—include one or more input devices to allow data to be input into/received by system 400 and one or more output device to allow data to be output by system 400. Example devices are described below, however it will be appreciated that not all computer processing systems will include all mentioned devices, and that additional and alternative devices to those mentioned may well be used.

For example, system 400 may include or connect to one or more input devices by which information/data is input into (received by) system 400. Such input devices may include keyboard, mouse, trackpad, microphone, accelerometer, proximity sensor, GPS, and/or other input devices. System 400 may also include or connect to one or more output devices controlled by system 400 to output information. Such output devices may include devices such as a display (e.g., a LCD, LED, touch screen, or other display device), speaker, vibration module, LEDs/other lights, and/or other output devices. System 400 may also include or connect to devices which may act as both input and output devices, for example memory devices (hard drives, solid state drives, disk drives, and/or other memory devices) which system 400 can read data from and/or write data to, and touch screen displays which can both display (output) data and receive touch signals (input).

By way of example, where system 400 is a client device such as 302 it may include a display 418 (which may be a touch screen display), a cursor control device 424 (e.g., a mouse, trackpad, or other cursor control device), and/or a keyboard 426.

System 400 also includes one or more communications interfaces 416 for communication with a network, such as network 308 of environment 300 (and/or a local network within the server system 304). Via the communications interface(s) 416, system 400 can communicate data to and receive data from networked systems and/or devices.

System 400 may be any suitable computer processing system, for example, a server computer system, a desktop computer, a laptop computer, a netbook computer, a tablet computing device, a mobile/smart phone, a personal digital assistant, or an alternative computer processing system.

System 400 stores or has access to computer applications (also referred to as software or programs)—e.g. computer readable instructions and data which, when executed by the processing unit 402, configure system 400 to receive, process, and output data. Instructions and data can be stored on non-transitory computer readable media such as 410 accessible to system 400. Instructions and data may be transmitted to/received by system 400 via a data signal in a transmission channel enabled (for example) by a wired or wireless network connection over an interface such as communications interface 416.

Typically, one application accessible to system 400 will be an operating system application. In addition, system 400 will store or have access to applications which, when executed by the processing unit 402, configure system 400 to perform various computer-implemented processing operations described herein. For example, and referring to the networked environment of FIG. 3 above, server system 304 includes one or more systems which run a server application 312 and a database application 314. Similarly, client device 302 runs a client application 310.

In some cases part or all of a given computer-implemented method will be performed by system 400 itself, while in other cases processing may be performed by other devices in data communication with system 400

Example Methods

This section describes computer-implemented methods for displaying, updating, and creating alert decks according to some aspects of the present disclosure. The methods will be described with reference to flowcharts, which illustrate processing performed by the server application 312, the synchronization system 306 and/or the client application 310 in order to perform one or more of these methods. In particular, method 500 shows how an alerts UI is displayed, methods 600-700 show how an alerts UI is updated, and method 800 shows how a new alert deck is added to an alerts UI.

Method 500 commences at step 502, where the client application 310 generates a UI load request and communicates it to the server application 312. In one example, a user of a client device 302 may execute the client application 310 and log in to/register with the client application 310 (this logged-in or registered user is also referred to as a principle user in this disclosure). In some cases, an alerts UI (e.g., UI 200) may be the landing or home page of the client application 310 once the user has logged in. In such cases, the client application 310 may automatically generate a UI load request when the principle user is logs in and communicates the request to the server application 312. In other examples, the user may select the alerts UI to be displayed (e.g., by selecting a suitable affordance, tab, icon, etc., on the home page of the client application 310). When this happens, the client application 222 generates a UI load request and communicates it to the server application 312. The UI load request may include an identifier of the principle user.

In some examples, the client application 310 may maintain user preferences in a local database. In such cases, the local database may store information about the alert decks maintained by the user. This information may include names and/or identifiers of the alert decks and the search strings or underlying alert parameters associated with the alert decks. If the client application 310 maintains this information, it is retrieved from the local database at step 502 and included in or with the UI load request when the request is communicated to the server application 312.

In other examples, this alert deck information is maintained by the server application 312. In particular, whenever a user adds an alert deck to their UI 200, information about the new alert deck is provided to the server application 312. This information may include names and/or identifiers of the alert decks and the search strings or underlying parameters associated with the alert decks. The server application 312 may store this information in an alert deck database that maintains the alert deck information for all users of the IMA. Table A below shows an example of the alert deck data that may be stored by the server application 312.

TABLE A example alert deck database

| User ID | Alert ID | Alert parameters |
|---|---|---|
| 3240923 | US_Prod | Source: spacemonkey<br>Tag: cloud AND US and Major<br>Owner: prod team<br>Acknowledged: True<br>Count >=20 |
| 3948230 | Sydney snoozed | Source: spacemonkey<br>Tag: cloud AND Sydney<br>Snoozed: True |
| 3240923 | New_P5 | Source: ALL<br>Alert Priority: P5<br>Open: True<br>Owner: ALL |
| ... | ... | ... |

As shown in this table, each record stores an identifier of the principle user that created the alert deck, an alert deck identifier, and the alert parameters corresponding to that alert deck. Each time a new alert deck is created, a new record may be created and added to this database. Each time an alert deck is deleted, the corresponding database record may be deleted from this database. Similarly, each time an alert deck is updated (e.g., the deck name or the underlying parameters), the corresponding database record is updated. This way, alert deck database maintains accurate information about the alert deck statuses of all users of the IMA.

When this information is stored on the client devices 302, the IMA may not be able to replicate the same alert UI if the user logs in via different client devices (as different client devices may store different versions of the alert deck data). Alternatively, or additionally, if the information is stored in the server database 316, the same alerts UI can be replicated for a user on any client device the user uses.

Returning to method 500, at step 504, the server application 312 determines the number of alert deck(s) present in the requested alert UI and the alert parameters for each of those alert decks. In case alert deck information is stored in the client storage, the server application 312 receives the alert deck information from the UI load request. Alternatively, or additionally, if alert deck information is stored on the server system 304, the server application 312 may perform a lookup of the principle user's identifier received as part of or along with the UI load request in the user identifier field of the alert deck database (e.g., table A). Accordingly, at step 504, based on the lookup in the UI load request or in the alert deck database, the server application 312 determines the number of alert decks present in the requested alert UI and also determines the parameters associated with those alert decks.

At step 506, the server application 312 executes searches for each of the alert decks present in the alert UI. The number of searches depends on the number of alert decks present in the requested alert UI. Further, the server application 312 may construct individual search queries based on the alert parameters associated with each of the alert decks. In one example, if the user identifier of the principle user is 3240923, the server application 312 may perform a lookup in table A to determine that the user identifier 3240923 is associated with two alert decks (US_Prod and New_P5). It may retrieve the corresponding alert parameters and construct the following search strings based on the alert parameters:

Source: spacemonkey AND (Tag: cloud AND US and Major) AND Owner: prod team AND Acknowledged: True AND Count>=20
Alert Priority: P5 AND Open: True Once the search strings are generated, the server application 312 communicates the search strings to the database application 314 in one or more data requests. In one example, this is done as multiple different data requests—each data request corresponding to a search string.

At step 508, the database application 314 receives the data request(s) and identifies one or more alerts that satisfy each of the search strings. To this end, the database application 314 may sequentially or simultaneously query the database 316 using the search string received as part of each data request and retrieve alert data of the one or more alerts that match those search strings. For instance, in case of the example discussed above, the database application 314 identifies all acknowledged alerts originating from spacemonkey for the prod team that include the words cloud, US and Major in their alert description or alert tags. It also identifies all open alerts that have a P5 alert level. Once the database application 314 identifies these alerts, it also retrieves alert data of these alert.

In one example, the database application 314 retrieves the alert identifiers and summary information for each of the alerts. In another example, the database application 314 retrieves the alert identifiers and all the corresponding alert information (e.g., detailed alert summary, comments, etc.) for each of the alerts. The retrieved information is communicated back to the server application 312 in response to the corresponding data requests.

At step 510, the server application 312 communicates the received alert data to the client device. In one example, the server application 312 bundles the alert data received for each alert deck in one single response file (e.g., JSON file) and communicates it to the client device 304. In another example, where the server system 304 is a distributed, cluster-based system, responses for some of the data requests may be received earlier and responses for other data requests may be received later. In such cases, the server application 312 communicates the alert data to the client device 302 in stages. Initially, e.g., even before step 506, the server application 312 may communicate the number of alert decks and their alert Ids and/or alert parameters to the client device 302. Based on the received information, the client application 310 may be able to render a structure of the alert UI 200 including e.g., the number of columns or alert decks that will be required. Next, the server application 312 may communicate the alert data it receives from the database application 314 as and when it is received. For instance, if the alert data corresponding to one data request is received first, it is communicated to the client device 302. When alert data for the next data request is received, it may be communicated to the client device 302. Table B below shows an example alert data file for a given alert deck.

TABLE B example alert deck file

"alerts": [
  {
    "id": "be7c438c-9adf-425c-ab22-fa9be8e89016-1647939690866",
    "createdAt": "Mar 22, 2022 12:01 PM (GMT+03:00)", TABLE B-continued example alert deck file

```
"createdAtTimestamp": 1647939690866,
"tinyId": "40911",
"isSeen": false,
"insertedAt": "1647939690866000032",
"tag": [
   "closeLocked",
   "lab"
],
"teamIds": [
   "95b73dfd-35b9-460b-adf4-26b497a951e9"
],
"message": "ALARM: \" critical-error messageCount Too High\"" in US West",
"status": "open",
"statusLabel": "open",
"acknowledged": false,
"owner": "",
"ownerShortName": "",
"ownerTeamId": "95b73dfd-35b9-460b-adf4-26b497a951e9",
"acknowledgedBy": "",
"closedBy": "",
"snoozed": false,
"snoozedUntilTimestamp": 0,
"escalationIds": [
   "a397cfad-ac45-46d9-ad72-d855091d8e8c"
],
"count": 1,
"actions": [ ],
"availableActions": [
   0
],
"alertType": "Raw",
"priority": "P3",
"aggregationCount": 0,
"lastOccurredAt": "1647939690866",
"internalDetails": { },
"encrypted": false,
"responders": [
   {
      "id": "95b73dfd-35b9-460b-adf4-26b497a951e9",
      "type": "team",
      "name": "sre-ops"
   }
]
},
..... [[data for other alerts in alert deck]]
{
"count": 4
}
```

Once the client application 310 receives alert data for the plurality of alert decks (either in a single file or in multiple files), it creates a display cache 318. The display cache 318 includes the received alert deck data (either in the form of a database or in the form of static files). Further, as shown in table B above, for each alert deck, the display cache 318 may include alert data of the alerts that are part of that alert deck. This may include, e.g., the unique identifier of each displayed alert, the summary information such as the alert level, the current status of the alert, the alert name, time the alert was generated, etc, actions available for the alert (e.g., snooze, assign, acknowledge, etc.), and/or detailed information such as comments associated with the alert, etc.

In addition to creating the display cache 318, the client device 302 and in particular the client application 310 also displays the requested alert UI on a display of the client device 302. In one example, the displayed alert UI may look like alert UI 200. That is, for each alert in a given alert deck, the alert UI may include a graphical element. The graphical element displays information about the corresponding alert and includes interactive elements to perform one or more actions on the alerts.

Figure 6:
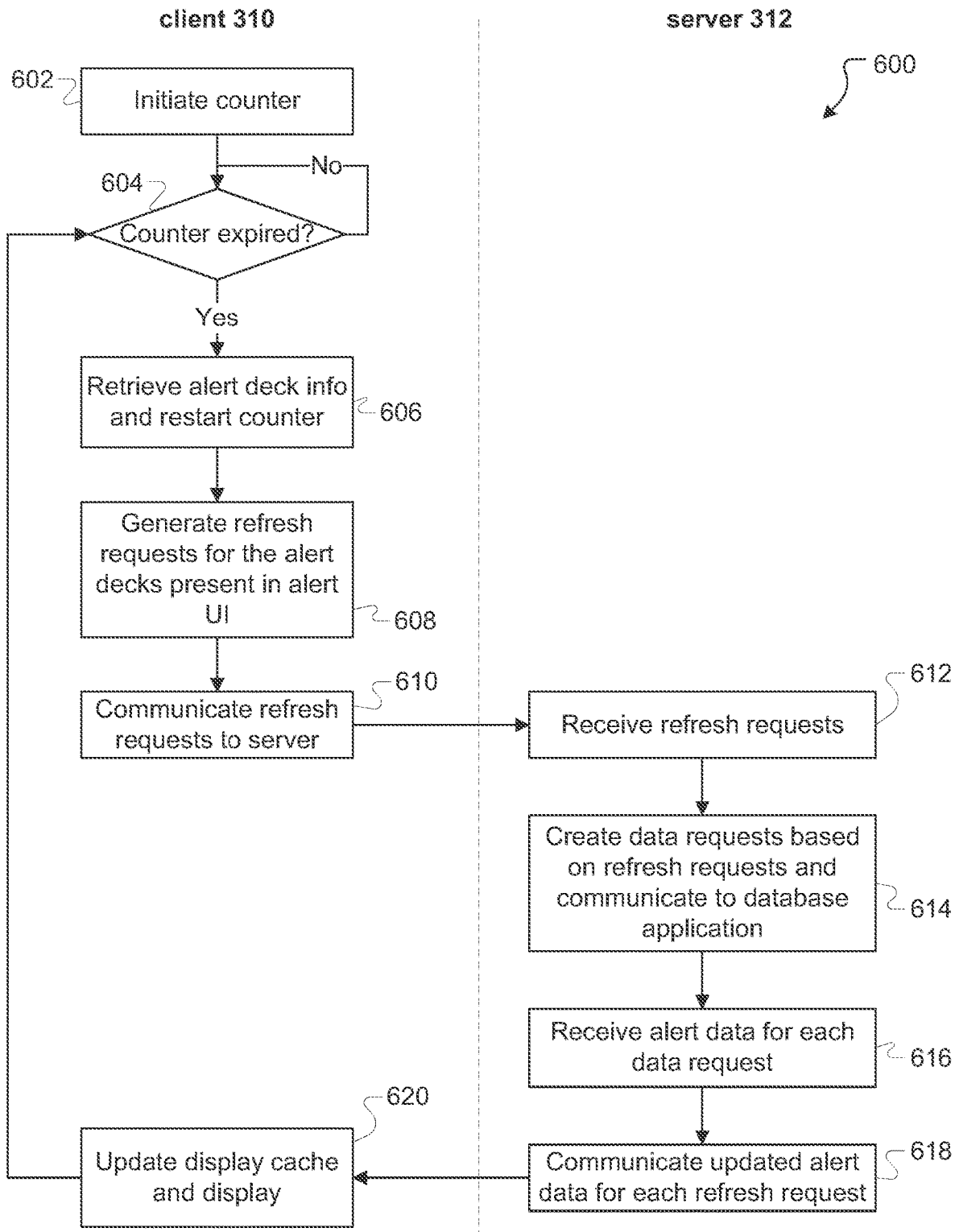
FIG. 6 is a flowchart illustrating an example method for updating an alert UI according to some aspects of the present disclosure.

FIG. 6 illustrates an example method 600 for updating the one or more alert decks displayed in an alert UI according to aspects of the present disclosure.

The method 600 commences at step 602, where the client application 310 initiates a refresh counter. This may be a configurable predetermined counter (e.g., 30 seconds, 60 seconds, 5 minutes, 10 minutes, etc.). In some embodiments, the refresh counter is initiated as soon as the display cache 318 is created and/or the alert UI is initially displayed.

Next, at step 604, the client application 310 determines whether the refresh counter has expired.

If the client application 310 determines that the refresh counter has not yet expired, the method returns to step 604. Alternatively, or additionally, if the client application 310 determines that the refresh counter has expired, the method proceeds to 606.

At step 606, the client application 310 retrieves the alert deck information (including the alert deck names and parameters) from the display cache. The client application 310 also restarts the expired refresh counter.

At step 608, the client application 310 generates one or more refresh requests based on the number of alert decks present in the alert UI). Each refresh request includes the identifier of the corresponding alert deck and the corresponding alert parameters.

At step 610, the one or more refresh requests are communicated to the server application 312.

Next, at step 612, the server application 312 receives the one or more refresh requests.

At step 614, the server application creates data requests based on the refresh requests and communicates these to the database application 314. This step is similar to step 506 described above and therefore is not described here again.

At step 616, the server application receives alert data corresponding to each of the data requests from the database application 314.

At step 618, the server application 312 communicates the received alert data back to the client application 310. This step is similar to step 510 described above and therefore is not described here in detail again.

At 620, once the client application 310 receives the alert data for each of the alert decks and updates the display cache 318. In one example, the client application 310 may flush the previous version of the display cache 318 and create a new version based on the received data. In another example, the client application 310 compares the received alert data with the alert data present in the display cache 318 and only updates data in the display cache that has changed. For example, if new alerts are available in an alert deck, data for the alert is added to the corresponding alert deck. If an alert is deleted from an alert deck, data for that alert is removed from the corresponding alert deck in the display cache 318. Similarly, if the alert data for an alert has been updated, e.g., an alert level has changed, the corresponding alert data can be updated. Any changes made to the display cache 318 are also reflected in the displayed alerts UI.

The method then returns to step 604.

Figure 5:
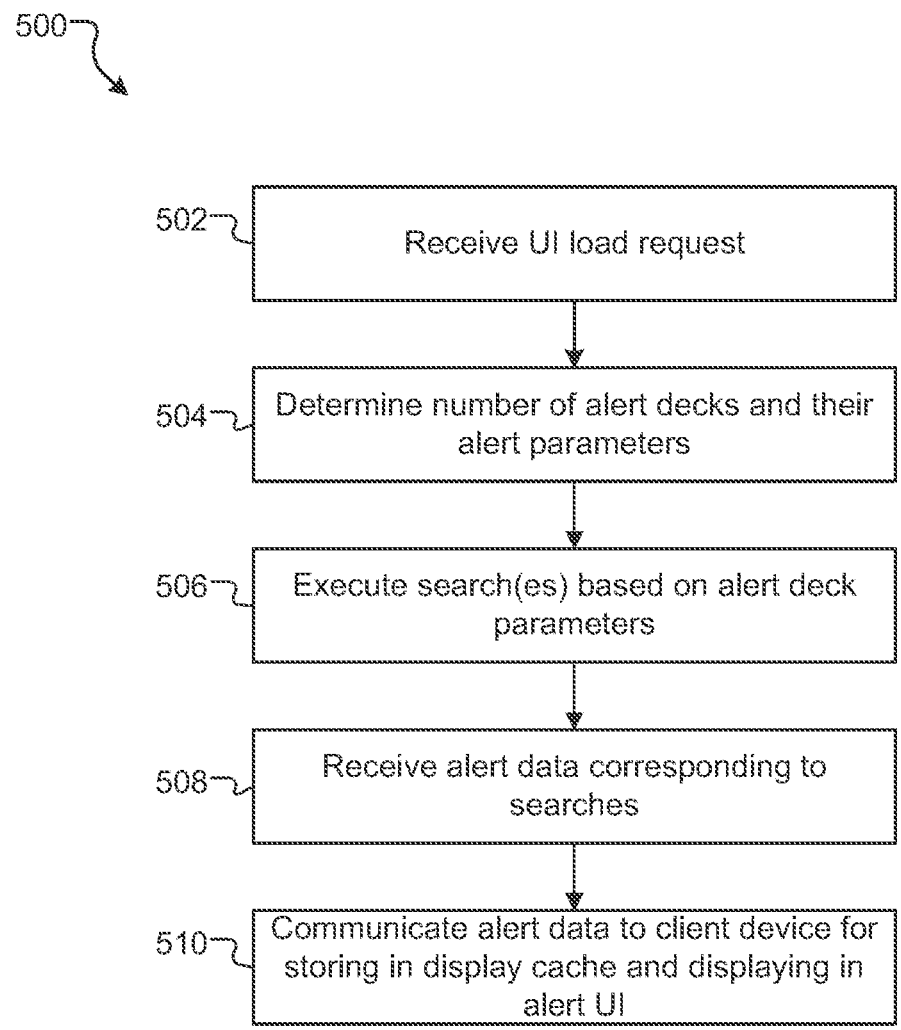
FIG. 5 is a flowchart illustrating an example method for displaying an alert UI according to aspects of the present disclosure.

In the method described above, it is presumed that the client application communicates alert deck data (Id and parameters) to the server application 312 as part of the refresh requests. In some embodiments, this may not happen. Instead, the client application 310 may communicate the user identifier of the principle user as part of the refresh request. In such cases, the server application 312 is configured to retrieve alert deck data from the alert deck database (e.g., table A) and perform a method similar to that described with reference to steps 504-510 of FIG. 5 upon receiving the refresh request(s).

It will be appreciated that method 600 describes a manner to update the alert UI where the client polls the server application 312 for updates at predetermined intervals. If the alert UI includes many alert decks, e.g., 10 or more alert decks, the client application 310 communicates 10 refresh requests every few seconds or minutes and the database application 314 has to respond to 10 such refresh requests every few seconds. If may not be a problem if the server system 304 is handling a few users. However, if the server system 304 handles hundreds or thousands of the users, the number of refresh requests received at the server increase hundred or thousand fold. This large number of periodic refresh requests can cause a significant burden on the database application 314 and database 316, causing a bottleneck, and slowing down response times not only for refresh requests but for other read or write requests as well.

To address this, in some embodiments, the server application 312 can push updates to the synchronization system 306 and the synchronization system 306 can push these updates to the client devices. This way, client devices 302 may only generate refresh requests when an update has occurred and the update affects the alert decks displayed in alert UIs on the client devices 302.

As described above, the synchronization system 306 may operate based on a publish-subscribe model. The server application 312 publishes any updates to the alerts maintained in the database 316 to the synchronization system 306 and the synchronization system 306 pushes the updates to the client applications 310 that have registered with the synchronization system 306 to receive the published updates. As client application 310 may not be active 24×7 and may not display the alert UI all the time, the client application 310 has to register with the synchronization system 306 each time the alert UI is displayed and remains registered with the synchronization system 306 while the alert UI is displayed.

Co-pending U.S. patent application Ser. No. 16/830,398, titled, "Systems and Methods for delivering updates to client devices" describes a method for registering a client device with the synchronization system 306 in FIG. 4 and the corresponding description. That FIG. and corresponding description are incorporated herein in their entirety. In some examples, the client applications 310 may subscribe to receive update notifications for the alert decks maintained by the client applications. For example, if a particular client application 310 displays three alert decks, it may subscribe to receive update notifications applicable only to those three alert decks. To this end, the client applications 310 may provide the identifiers of the alert decks maintained on the corresponding client devices 302 to the synchronization system 306. The synchronization system 306 stores this information against identifiers of the principal users associated with the client applications 310.

Once a client application 310 has registered with the synchronization system 306 and a communication channel is setup in the manner described in U.S. patent application Ser. No. 16/830,398, titled "Systems and Methods for delivering updates to client devices," update notifications may be pushed to the client application 310 each time relevant updates are received at the synchronization system 306 from the server application 312.

Figure 7:
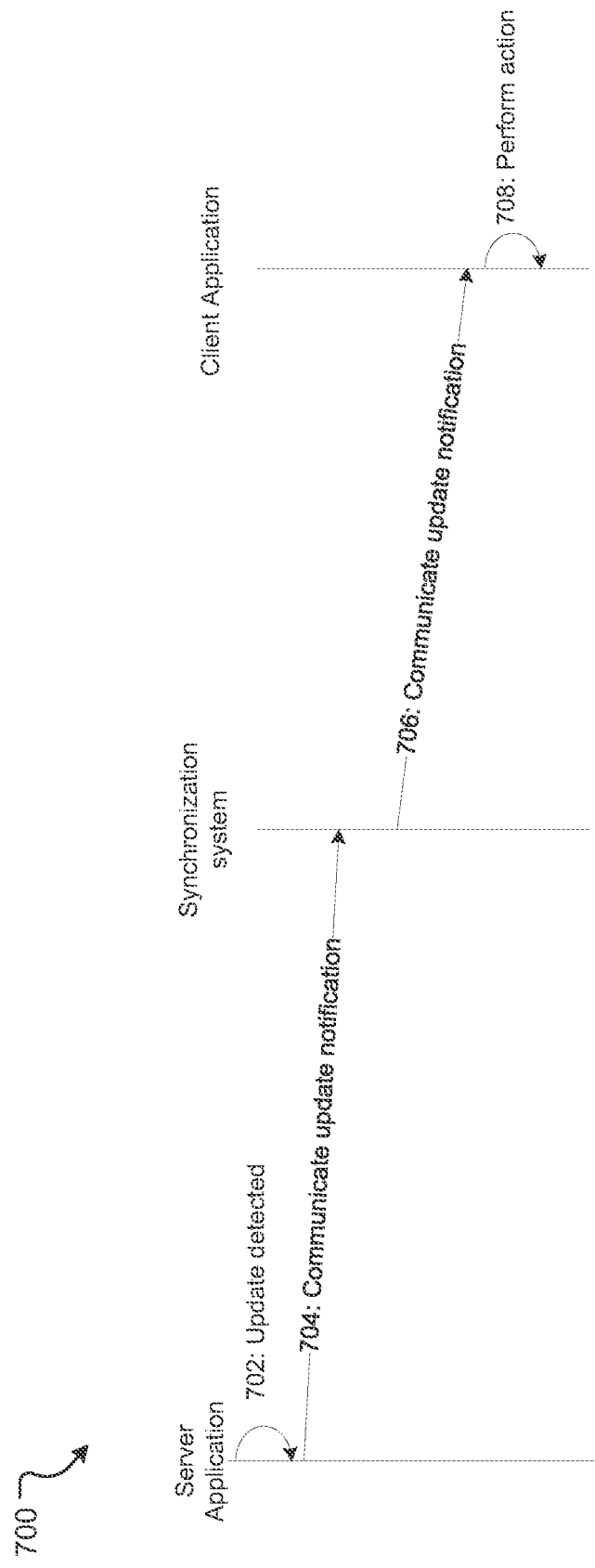
FIG. 7 is a flowchart illustrating another example method for updating an alert UI according to some aspects of the present disclosure.

FIG. 7 is a flowchart illustrating an example method for updating alert decks. In particular, FIG. 7 illustrates a method to update one or more alert decks displayed by a client application that has registered with the synchronization system 306.

The method 700 commences at step 702 where an update is available at the server application 312. The update may be the addition, deletion, or change of an alert. The server application 312 generates an update notification associated with the update and pushes the update notification to the synchronization system 306. The update notification may include a unique identifier of the update. In addition, summary information about the alert may also be included in the update notification, e.g., if the update corresponds to an addition or change event instead of a deletion event.

In one example, the update notification includes a list of alert decks that will be affected by the update notification. In such cases, whenever an update occurs, the server application 312 determines which active alert decks would be affected by the update (e.g., by comparing the updated alert with the alert deck parameters in alert deck database shown in table A). It may then add a list of the alert decks that would be affected by the update in the update notification before communicating it to the synchronization system 306 at step 704.

The synchronization system 306 temporarily stores the update notification in the notification database/cache 320 once it is received.

Next, at step 706, the synchronization system 306 pushes the update notification to one or more active client applications 310 connected to and registered with the synchronization system 306. In certain embodiments, the synchronization system 306 may compare the alert deck identifiers received in the update notification with the alert deck identifiers provided by the client application 310 when they synchronized with the synchronization system 306. If an alert deck identifier received in the update notification matches the alert deck identifier provided by one or more of the client applications 310, the synchronization system 306 forwards the update to the corresponding client applications 310.

In one example, the update notification forwarded to the client application 310 includes the alert identifier, the summary information of the alert, and the identifiers of the alert deck(s) maintained by the client application 310 that the update notification corresponds to. Table C shows example alert data received as part of an update notification in some examples.

TABLE C

Example update notification

{
"update": [
  {
    "id": "be7c438c-9adf-425c-ab22-fa9be8e89016-1647939690866",
    "createdAt": "Mar 22, 2022 12:01 PM (GMT+03:00)",
    "createdAtTimestamp": 1647939690866,
    "tinyId": "40911",
    "isSeen": false,
    "insertedAt": "1647939690866000032",
    "tag": [
      "closeLocked",
      "lab"
    ],
    "teamIds": [
      "95b73dfd-35b9-460b-adf4-26b497a951e9"
    ],
    "message": "ALARM: \" critical-error messageCount Too High\" in US West ",
    "status": "open",

TABLE C-continued

Example update notification

```
    "statusLabel": "closed",
    "acknowledged": false,
    "owner": "",
    "ownerShortName": "",
    "ownerTeamId": "95b73dfd-35b9-460b-adf4-26b497a951e9",
    "acknowledgedBy": "",
    "closedBy": "",
    "snoozed": false,
    "snoozedUntilTimestamp": 0,
    "escalationIds": [
        "a397cfad-ac45-46d9-ad72-d855091d8e8c"
    ],
    "count": 1,
    "actions": [ ],
    "availableActions": [
        0
    ],
    "alertType": "Raw",
    "priority": "P3",
    "aggregationCount": 0,
    "lastOccurredAt": "1647939690866",
    "internalDetails": { },
    "encrypted": false,
    "responders": [
      {
         "id": "95b73dfd-35b9-460b-adf4-26b497a951e9",
         "type": "team",
         "name": "sre-ops"
      }
    ],
    "alertdecks" : [
        "US Open Alerts",
        "Prod Open Alerts"
    ]
   }
  ],
  "count": 1
}
```

As seen in table C, the update notification includes information about the alert that is being updated, its summary information, information about any actions that can be performed on the alert, and the alert decks the update notification affects. In case the update notification is for a deleted alert, the update notification may simply include the alert identifier along with an indication that the alert has been deleted and the alert decks it corresponds to.

Once the client application 310 receives the update notification, it performs an action based on the received update at step 708. Generally speaking, as previously described, the client application 310 maintains a display cache 318 of the alerts currently displayed via the client application. Depending on the type of update notification, the client application 310 perform one or the other function.

For example, if the update notification is a deletion event, the client application 310 is configured to simply delete the record of the corresponding alert from all the alert decks mentioned in the update notification, and consequently, the alert is removed from all the corresponding alert decks it was displayed in.

In some embodiments, when the alert is removed from the alert UI 200, it may be replaced by a notification informing the client that the alert has been removed from the corresponding alert deck. In other embodiments, if additional information about the update is available (e.g., information indicating the reason the alert is deleted and/or by whom), the client application 310 can replace the deleted alert with a notification indicating the reason for the deletion (e.g., the notification can state, "Alert #690 acknowledged successfully" or "Alert #690 acknowledged successfully by John Doe").

In some cases, a user may select multiple alerts and delete multiple alerts in a single action. For example, by selecting an option such as "delete all." In such cases, the update may include identifiers for multiple alerts that need to be deleted from a client application 310 of the user currently displaying those alerts. In such a case, when the client application 310 determines that two or more of the multiple deleted alerts are present in the display cache, the client application 310 may delete the two or more alert records and display a single notification on the user interface in place of the two or more alerts. The notification informing the user, e.g., "7 alerts deleted."

In some embodiments, the deleted alert may be removed from the alerts UI with a visualization—e.g., alert fading and remaining alerts rearranging themselves on the display, the alert moving upwards and the subsequent alerts in the list moving upwards, etc.

Alternatively, or additionally, if the update notification is for an update event, the client application 310 updates the corresponding alert information in the display cache and alert UI based on the alert information provided in the update notification (e.g., as shown in Table C). For example, if a response indicates that the status of an alert has changed, the client application 310 may change the status of the alert for the corresponding alert deck in the cache 318 and the UI. Further, if the update notification is for an update event, the client application 310 may determine whether the updated alert still matches the criteria for the alert deck it was a part of. If the client application 310 determines that the updated alert no longer matches the criteria for the alert deck it was a part of, the client application 310 deletes the alert from the corresponding alert deck. Alternatively, or additionally, if the updated alert still matches the criteria for the alert deck it was a part of, the client application 310 updates the alert in the display cache and the alert UI. It will be appreciated that if the updated alert was part of two alert decks and still matched the parameters of one of the alert decks but did not match the parameters for the other alert deck, the client application 310 would display the updated alert in one of the alert decks and delete the alert from the other alert deck.

Alternatively, or additionally, if the update notification is for an addition event, the client application 310 add the alert information received as part of the update notification to the corresponding alert deck data in the display cache 318 and adds a graphical element for the alert in the corresponding alert deck displayed on the client device 302. Once the update is incorporated, the update method ends.

In this example process, it is assumed that the server application 312 forwards an alert identifier and summary information to the synchronization system 306 as part of the notification update. However, in some examples, the server application 312 may only forward an alert identifier and in other examples, it may not even forward the alert identifier. Instead, it may only forward identifiers of alert decks that have been affected by an update. In such cases, the client application 310 may simply receive an update notification informing them that an update is available for one or more alert decks maintained by the client application 310. The client application 310 can then simply query the server application 312 for more information about the update. For example, in case only an alert identifier is provided, the client application 310 may request the server application 312 to provide summary data for that alert identifier. Alternatively, or additionally, if no information (other than alert deck identifier) is provided via the update notification, the client application 310 may simply query the server application for updates on all the alert deck(s) that were included in the update notification. Although this may be a more resource intensive solution, it may be the most secure option as no update data is shared with the synchronization system 306 at any stage.

Figure 8:
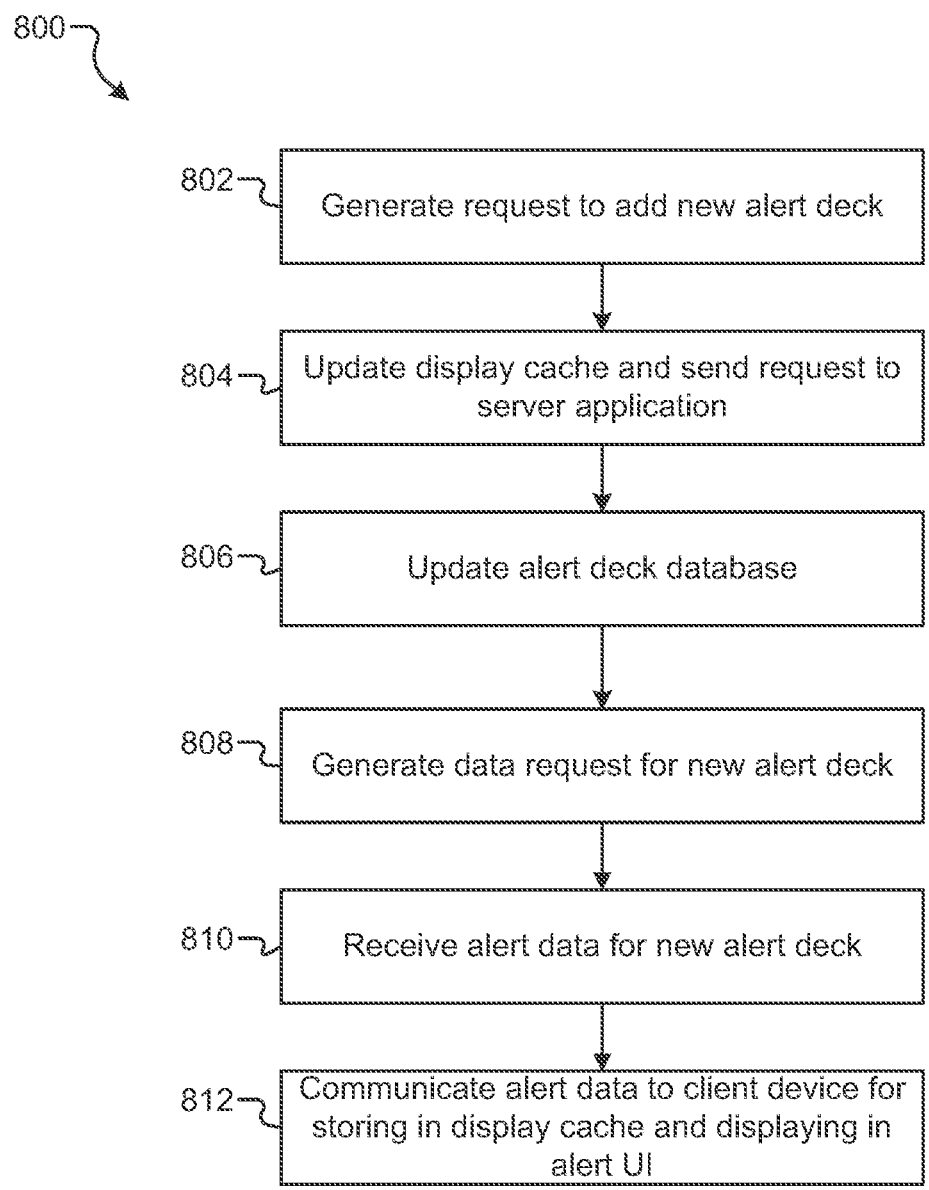
FIG. 8 is a flowchart illustrating an example method for adding an alert deck to an alert user interface according to aspects of the present disclosure.

FIG. 8 illustrates an example method 800 for creating an alert deck in an alert UI. The method 800 commences at step 802 where a request to create a new alert deck is generated. In one example, the alert UI includes an interactive element for creating a new alert deck. The interactive element may be, e.g., a search bar. In another example, the interactive element may be an interactive affordance, such as an "add deck" or "+" affordance. When the user selects the interactive affordance a search bar or input form may be displayed to allow the user to input parameters for the alert deck.

Figure 9:
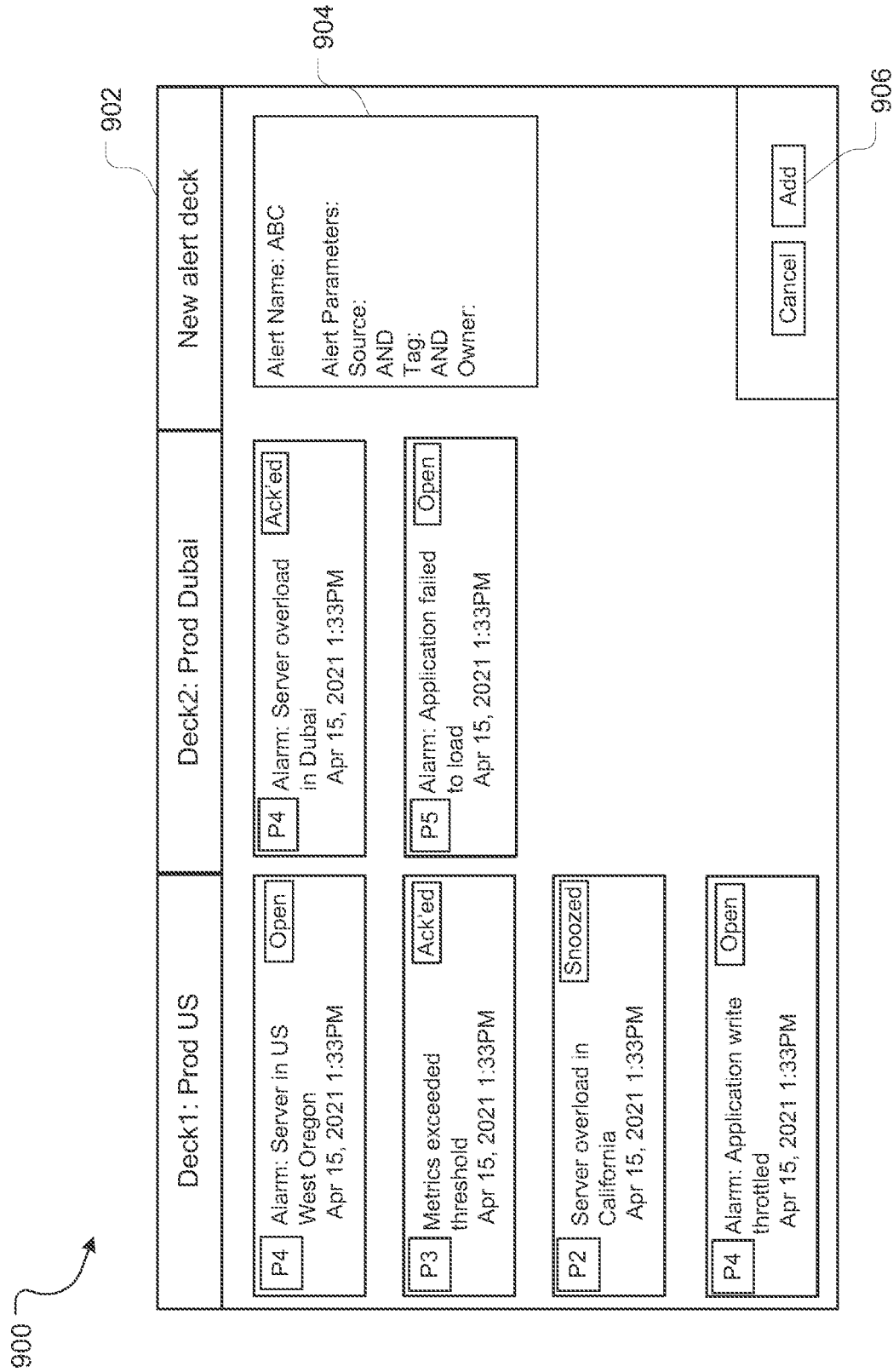
FIG. 9 is an example alert UI showing a mechanism to add an alert deck.

FIG. 9 illustrates an example alert UI 900 with a mechanism for adding a new alert deck. In this example, the UI includes a new column interface 902 that includes an input form 904 for accepting parameters for the new alert deck. Once the user inputs the alert deck name and parameters, the user may select the "add" affordance 906.

Whichever mechanism is adopted to provide user input to add an alert, it causes a request to create a new alert deck to be generated by the client application 310. The request includes the alert name and parameters and the user identifier of the principle user.

At step 804, the client application 310 updates the display cache 318 to add the alert deck name and parameters. It may also update the alert UI to include another column for the new alert deck. At step 804, the client application 310 also forwards the new alert deck request to the server application 312.

At step 806, the server application 312 receives the new alert deck request and updates the alert deck database to include details of this new alert deck. In particular, the server application 312 adds a new record in the alert deck database (e.g., table A) that includes the user identifier, alert identifier and alert parameters received in the new alert deck request.

Thereafter, the method proceeds to step 808, where the server application 312 generates and sends a data request to the database application 314. This includes generation of a search string for the new alert deck (based on the alert parameters) and communication of this to the database application 314 as part of the data request.

At step 810, the server application 312 receives alert data for the new alert deck from the database application 314 and at step 812 it communicates this alert data to the client application 310. The client application 310 in turn updates the display cache and the alert UI. Steps 808-812 are similar to steps 506-510 of method 500 and therefore are not described in detail again.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including," "includes," "comprising," "comprises," "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

The invention claimed is:

1. A computer-implemented method, the method comprising:
receiving, from a frontend client executing on a client device and at a backend executing on a server, a request to display a first object deck and a second object deck on a graphical user interface of the frontend client, the first object deck corresponding to incident alerts satisfying a first set of object deck parameters and the second object deck corresponding to incident alerts satisfying a second set of object deck parameters, the request comprising a first identifier of the first object deck and a second identifier of the second object deck;
at the backend:
based on the first identifier and the second identifier, retrieving, by the backend, the first set of object deck parameters of the first object deck and the second set of object deck parameters of the second object deck, respectively;
based on the first and second sets of object deck parameters, executing at least one query to identify a first set of objects of the first object deck and a second set of objects of the second object deck, respectively;
in response to the query, receiving, by the backend:
the first set of objects and corresponding object data of the first object deck, the first set of objects including a first subset of objects and a second subset of objects, each subset satisfying the first set of object deck parameters; and
the second set of objects and corresponding object data of the second object deck, the second set of objects including the first subset of objects and a third subset of objects, each subset satisfying the second set of object deck parameters, the second subset of objects different than the third subset of objects;
causing display of, on the graphical user interface of the frontend client, the graphical user interface comprising:
the first set of objects in a first region of the graphical user interface; and
the second set of objects in a second region of the graphical user interface, the second region non-overlapping with the first region;
in response to a user input provided to the graphical user interface, causing creation of a new deck based on a set of new object deck parameters;
obtaining an identifier of a principal user operating the graphical user interface;

causing storage of data regarding the new deck including the new object deck parameters and the identifier of the principal user;

causing display of a third set of objects retrieved using the new object deck parameters in a third region of the graphical user interface, displaying the third set of objects in the third region causes the first region and the second region to be rearranged on the graphical user interface, the first, second, and third regions being displayed concurrently.

2. The computer-implemented method of claim 1, wherein:

the request comprises the identifier of the principal user of the client device, or the first set of object deck parameters and the second set of object deck parameters each comprises one or more of: an alert type of alert, a location of the alert, or a product corresponding to the alert.

3. The computer-implemented method of claim 2, further comprising:

determining a plurality of object decks including at least the first object deck or the second object deck by performing a lookup of the identifier of the principal user in an object deck database.

4. The computer-implemented method of claim 1, further comprising refreshing the first set of objects of the first object deck or the second set of objects of the second object deck displayed on the graphical user interface.

5. The computer-implemented method of claim 4, comprising:

receiving a refresh request for the first object deck or the second object deck displayed on the graphical user interface;

in accordance with the refresh request, retrieving object deck parameters of the first object deck or the second object deck;

using the retrieved object deck parameters, executing a database query to identify one or more objects of the first object deck or the second object deck;

receiving updated object data for the identified one or more objects of the first object deck or the second object deck; and communicating the updated object data to the client device to cause display on the graphical user interface of the graphical elements corresponding to the one or more objects of the first object of the second object deck.

6. A computer implemented method, the method comprising:

receiving, at a client device and from a backend, an update notification for updating one or more objects of one or more of a first object deck and a second object deck of a plurality of object decks the first object deck corresponding to incident alerts satisfying a first set of object deck parameters, and the second object deck corresponding to incident alerts satisfying a second set of object deck parameters different from the first set of object deck parameters;

in response to receiving the update notification from the backend, causing display on the client device of a user interface (UI) comprising:

a first set of objects of the first object deck displayed in a first region the first object deck including a first subset of objects including a particular object and a second subset of objects, the first object deck updated in accordance with the update notification;

a second set of objects of the second object deck displayed in a second region non-overlapping with the first region, the second object deck including the first subset of objects and a third subset of objects different than the second subset of objects, the second object deck updated in accordance with the update notification;

in response to a selection of an option in the UI to add a new object deck, causing display of a new deck creation interface having one or more fields for receiving user input specifying new object deck parameters, the new object deck parameters different from the first and second sets of object deck parameters;

obtaining an identifier of a principal user associated operation of the UI;

causing storage of data regarding the new object deck including the new object deck parameters and the identifier of the principal user;

causing display of a third set of objects retrieved using the new object deck parameters in a third region of the UI, displaying the third set of objects in the third region causes the first region and the second region to be rearranged on the UI, the first, second, and third regions being displayed concurrently in the UI.

7. The computer implemented method of claim 6, wherein the update notification comprises updated object data of the one or more objects of the one or more of the first object deck or the second object deck; and updating the first or the second object deck of the plurality object decks comprises updating a graphical element of an updated object of the one or more updated objects based on the updated object data.

8. The computer implemented method of claim 6, wherein update notification includes an indication that an object of the first object deck or the second object deck has been deleted; and deleting a graphical element corresponding to the deleted object.

9. The computer implemented method of claim 6, further comprising:

generating a request for updated object data of the one or more updated objects;

communicating the request to a remote server of the backend;

receiving the updated object data; and in accordance with the received updated object data, updating or adding graphical elements on the UI corresponding to each of the one or more updated objects.

10. The method of claim 6, further comprising:

determining whether an object updated in accordance with the update notification match object parameters of one or more object decks of the plurality of object decks; and upon determining that the object updated in accordance with the update notification does not match at least one of the one or more object decks, deleting a graphical element of the one or more updated objects from the at least one of the one or more object decks.

11. A non-transitory computer readable media comprising instructions, which when executed by a central processing unit cause the central processing unit to perform operations comprising:

receiving a request to display a first object deck and a second object deck on a user interface (UI), the request comprising a first identifier of the first object deck and a second identifier of the second object deck;

retrieving, a first set of object deck parameters for the first object deck using the first identifier and a second set of object deck parameters for the second object deck using the second identifier;

based on the first and second sets of object deck parameters, executing at least one query to identify a first set of objects of the first object deck and a second set of objects of the second object deck, respectively, the first and second sets of objects corresponding to incident alerts satisfying the first and second set of object deck parameters, respectively;

in response to the query, receiving:
the first set of objects and corresponding object data of the first object deck, the first set of objects including a first subset of objects and a second subset of objects; and
the second set of objects and corresponding object data of the second object deck, the second set of objects including the first subset of objects and a third subset of objects different than the second subset of objects;

causing display of the first set of objects in a first region;
causing display of the second set of objects in a second region non-overlapping with the first region;
receiving, from a client device, a request to add a new object deck to a plurality of object decks;
in response to the received request to add the new object deck, causing display of a new deck creation interface having one or more fields for receiving user input specifying new object deck parameters;
at a backend executing on a server:
retrieving the new object deck parameters of the new object deck;
executing a search to identify one or more objects that match the new object deck parameters of the new object deck;
receiving object data for the identified one or more objects;
communicating, to the client device, the object data of the identified one or more objects;
obtaining an identifier of a principal user operating the UI;
causing storage of data regarding the new object deck including the new object parameters and the identifier of the principal user;
causing display, on a frontend client executing on the client device, of a third set of graphical elements corresponding to the new object deck, the third set of graphical elements displayed in a third region non-overlapping with the first and second regions, display of the third region causing a rearrangement of the first and second regions.

12. The non-transitory computer readable media of claim 11, wherein the request comprises the identifier of the principal user of the client device.

13. The non-transitory computer readable media of claim 12, further comprising:
determining the plurality of object decks by performing a lookup of the identifier of the principal user in an object deck database.

14. The non-transitory computer readable media of claim 11, further comprising instructions which when executed by the central processing unit cause the processing unit to refresh the plurality of displayed object decks.

15. The non-transitory computer readable media of claim 14, wherein refreshing the plurality of object decks comprises:
receiving refresh requests for each of the displayed object decks;
for each object deck:
retrieving object deck parameters;
executing a search to identify one or more objects that match the object deck parameters;
receiving updated object data for an updated object of an object deck of the plurality of object decks; and
communicating the updated object data to the client device to cause display on the UI of a graphical element corresponding to the updated object.

16. A system comprising:
a display;
a central processing unit;
a non-transitory computer readable memory comprising instructions, which when executed by the central processing unit cause the system to perform operations comprising:
at a backend executing on a server:
receiving an update notification for updating one or more objects of one or more of a first object deck corresponding to incident alerts satisfying a first set of object deck parameters and a second object deck corresponding to incident alerts satisfying a second set of object deck parameters, the first object deck including a first subset of objects and a second subset of objects, each the first and second subsets of objects satisfying the first set of object deck parameters, and the second object deck including the first subset of objects and a third subset of objects different than the second subset of objects, each the first and third subset of objects satisfying the second set of object deck parameters;
based on the first and second sets of object deck parameters, executing at least one search to identify a first set of objects of the first object deck and a second set of objects of the second object deck, respectively;
receiving, by the backend, updated object data comprising:
the first set of objects and corresponding object data of the first object deck; and
the second set of objects and corresponding object data of the second object deck; and
communicating the received first and second sets of objects to a frontend application;
causing display of a user interface (UI) comprising:
the first set of objects corresponding to a first set of incident alerts in a first region of the UI, the first set of objects updated in accordance with the update notification; and
the second set of objects corresponding to a second set of incident alerts in a second region of the UI, the second region non-overlapping with the first region, the second set of objects updated in accordance with the update notification;
in response to a user input provided to the UI, causing creation of a new deck based a set of new object deck parameters;
obtaining an identifier of a principal user operating the UI;
causing storage of data regarding the new deck including the set of new object deck parameters and the identifier of the principal user;
causing display of a third set of objects retrieved using the set of new object deck parameters in a third region of the graphical user interface, displaying the third set of objects in the third region causes the first region and the second region to be rearranged on the graphical user interface, the first, second, and third regions being displayed concurrently.

17. The system of claim 16, wherein:
the update notification comprises updated object data of the one or more objects of the one or more of the first object deck or the second object deck; and
updating the first or the second object deck comprises updating a graphical element of an updated object of the one or more updated objects based on the updated object data.

18. The system of claim 16, wherein the update notification includes an indication that an object of an object deck of a plurality of object decks has been deleted; and
deleting a graphical element corresponding to the deleted object of the object deck.

19. The system of claim 16, wherein the non-transitory computer readable memory further comprises instructions which when executed by the central processing unit cause the system to perform the operations comprising:

generating a request for updated object data of the one or more updated objects;
communicating, by the frontend, the request to the backend; and
in accordance with the received updated object data, updating or adding graphical elements on the UI corresponding to each of the one or more updated objects.

20. The method of claim 16, wherein the non-transitory memory further comprises instructions which when executed by the central processing unit cause the system to perform operations comprising:
determining whether an object updated in accordance with the update notification match object parameters of one or more object decks of the plurality of object decks; and
upon determining that the object updated in accordance with the update notification does not match at least one of the one or more object decks, deleting a graphical element of the one or more updated objects from the at least one of the one or more object decks.

* * * * *